United States Patent
Schmidt et al.

(10) Patent No.: US 6,479,156 B1
(45) Date of Patent: Nov. 12, 2002

(54) NANOCOMPOSITE FOR THERMAL INSULATION

(75) Inventors: Helmut Schmidt, Saarbruecken-Guedingen (DE); Martin Mennig, Quierschied (DE); Gerhard Jonschker, Spiesen-Elversberg (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/423,782

(22) PCT Filed: May 13, 1998

(86) PCT No.: PCT/EP98/02843

§ 371 (c)(1),
(2), (4) Date: Nov. 12, 1999

(87) PCT Pub. No.: WO98/51739

PCT Pub. Date: Nov. 19, 1998

(30) Foreign Application Priority Data

May 14, 1997 (DE) .......................................... 197 20 269

(51) Int. Cl.[7] .......................... B32B 17/06; C08K 9/04; C09D 5/18; C09K 9/04; E04B 1/74
(52) U.S. Cl. .................... 428/428; 106/18.12; 106/490; 252/62; 516/100; 516/101; 428/404; 428/921
(58) Field of Search ................................. 516/100, 101; 106/18.12, 490; 252/62; 428/404, 428, 921; 501/12

(56) References Cited

U.S. PATENT DOCUMENTS

| 3,640,837 | A | * | 2/1972 | Gaeth et al. ............ 428/428 X |
| 4,954,327 | A | * | 9/1990 | Blount ................ 106/18.12 X |
| 5,437,902 | A | * | 8/1995 | Itoh et al. ............... 428/921 X |
| 5,593,781 | A | * | 1/1997 | Nass et al. ................ 501/12 X |
| 5,683,501 | A | * | 11/1997 | Tomihisa et al. ....... 106/490 X |
| 5,738,801 | A | * | 4/1998 | Ziegler et al. ................ 252/62 |
| 5,853,886 | A | * | 12/1998 | Pinnavaia et al. ...... 428/404 X |
| 6,361,868 | B1 | * | 3/2002 | Bier et al. .................. 428/428 |

FOREIGN PATENT DOCUMENTS

| DE | 195 15 820 | * | 10/1996 |
| EP | 0 590 978 | * | 4/1994 |
| WO | WO97/16479 | * | 5/1997 |

* cited by examiner

Primary Examiner—Richard D. Lovering
(74) Attorney, Agent, or Firm—Heller Ehrman White & McAuliffe LLP

(57) ABSTRACT

The invention relates to a nanocomposite for thermal insulation especially for fireproofing purposes, which can be obtained by combining (A) at least 35 wt. % of nanoscaled, optionally surface-modified particles of an inorganic compound; (B) 10–60 wt. % of a compound with at least two functional groups which can react and/or interact with the surface groups of nanoscaled particles (A), (C) 1–40 wt. % of water and/or an organic solvent which has no functional groups or only one which is defined in (B), wherein the above-mentioned percentages relate to the sum of components (A), (B) and (C), and (D)=0–10 wt. % (based on the nanocomposite) of additives.

25 Claims, No Drawings

NANOCOMPOSITE FOR THERMAL INSULATION

This application is a 371 of PCT/EP 98/02843 May 13, 1998.

The present invention relates to a nanocomposite for thermal insulation (e.g., fireproofing), in particular, to a preferably transparent nanocomposite that is suitable as a filler for insulation glass assemblies.

Particularly when in contact with their solution phase, known solvent-containing inorganic gels show ageing phenomena that manifest themselves in shrinking in combination with haze, blistering as well as possibly cracking. Said signs of ageing are often summarized under the term syneresis, and in the literature they are explained by progressive condensation reactions and phase separation.

A gelled dispersion of $SiO_2$ particles in water, for example, can be prepared by concentrating diluted colloidal silica sol solutions. Upon gelation, the individual $SiO_2$ particles initially develop hydrogen bonding between them until Si—OH groups condense to form Si—O—Si bonds that cannot be cleaved anymore. Due to said rigid Si—O—Si bonds the gel becomes increasingly brittle and finally breaks under the influence of the capillary forces of the contained solvent and due to tensile stress caused by the shrinkage of the gel body.

It is known that reactive groups can be shielded by surface charges so that said syneresis-active groups are separated from each other. A well-known example thereof is the stabilization of $SiO_2$ with bases such as tetramethylammonium hydroxide. Said surface modification by charges is effective in preventing syneresis, however at the expense of a lack of immobilization since there is not sufficient interaction between the particles. Additionally, only relatively diluted solutions can be prepared in this manner since, if the particles come too close to each other, the shielding by charges breaks and a spontaneous gel formation occurs, resulting in a loss of the blocking of said syneresis.

For certain applications, e.g., as transparent filling between (fire protection) panes, it is necessary to employ gels which stay clear, without the ageing phenomena mentioned above, for extended periods of time. It is also important that said gels exactly maintain their shape when being filled into, e.g., spaces of complex shape in door or wall units made of different materials. Here it is also of particular importance that even at relatively high solids contents, no ageing phenomena due to solvents may occur. This is difficult because the natural ageing process via solution phases, which proceeds according to the Ostwald mechanism, usually cannot be avoided. However, high solids contents are necessary if such systems are to be used as heat protection. Upon the action of heat a foam having fine pores which acts as insulation is formed, as is known in the case of waterglass. A sufficiently high insulation effect as it is, e.g., required in the case of a fire (see, e.g., DIN 4102) can in turn only be realized by very thick fillings or multiple pane assemblies, which result in a very high weight of the system and thus limit the possible applications thereof.

The present invention, therefore, was based on the problem of providing gel systems which make it possible to obtain a sufficiently high solids content, while being absolutely free of syneresis, as well as layer thicknesses (as heat protection) which are significantly below the present state of the art and also provide long-term transparency, which is particularly indispensable in the case of transparent walls.

It has now surprisingly been found that transparent, solid gel materials which do not show ageing phenomena can be prepared by combining nanoscaled particles of inorganic solids with specific organic compounds which shield the groups that are responsible for said syneresis but at the same time develop sufficiently strong bonding forces which are necessary to form a mechanically stable gel body.

Due to the use of particles in the nm range, light scattering is so minimal that sufficient transparency can be ensured. Furthermore, the matrix structure at the interface with the particle is altered and, due to its high proportion, plays a decisive role in the overall properties of the system.

By employing the principle described above, solid and colorless nanocomposite gels which are stable against syneresis may thus be prepared by dispersing inorganic (preferably oxidic) particles in the presence of suitable substances which, on the one hand, protect syneresis-active groups of said colloidal particles and, on the other hand, still effect a certain degree of crosslinking of the particles.

Thus, an object of the present invention is a nanocomposite for thermal insulation, said nanocomposite being obtainable by combining (A) at least 35% by wt. of nanoscaled, optionally surface-modified particles of inorganic compound;

(B) 10–60% by wt. of compound having at least two functional groups capable of reacting and/or interacting with the surface groups of said nanoscaled particles (A);

(C) 1–40% by wt. of water and/or inorganic solvent which has no or only one functional group as defined above under (B); the above percentages being based on the sum of said components (A), (B) and (C); as well as (D) 0–10% by wt., based on said nanocomposite, of additives.

Preferably, the nanocomposite just defined is a transparent material which in its final state is present as a rigid (solidified), solid gel.

In the following, the materials constituting the nanocomposite according to the present invention will be described in more detail.

Component (A) consists of nanoscaled particles of inorganic compound. As used in the present specification and in the claims, the term "nanoscaled particles" refers to particles having an (average) particle size of up to 200 nm, preferably up to 100 nm and particularly up to 50 nm. A particularly preferred particle size ranges from 1–20 nm. For producing said nanocomposite said particles are to be employed in an amount of at least 35%, preferably at least 40%, and particularly at least 45% by wt., based on said components (A), (B) and (C).

Generally, said particles are particles of inorganic oxidic compounds, particularly of oxides of the elements aluminum, silicon, phosphorus, boron, tin, zinc, titanium, zirconium, tungsten, and the alkali and alkaline earth metals as well as of the mixed oxides of any of the oxides just mentioned, (mixed) oxides of Si, Al, Ti and/or Zr being preferred, and $SiO_2$ and mixed oxides thereof being particularly preferred. However, according to the present invention, inorganic compounds different from oxides, such as carbides, nitrides, silicides, borides and the like, may also be employed.

Said particles may either be employed as such or may also only be formed in situ by suitable processes (well-known to the person skilled in the art).

Furthermore, said particles may optionally be surface-modified. The surface modification of nanoscaled (particularly oxidic) particles is known from the prior art and described, e.g., in DE-A-42 12 633.

As described above, component (B) of the nanocomposite of the present invention serves to shield said nanoscaled particles of component (A) in a manner such that, on the one hand, ageing phenomena due to interparticular reactions may be avoided in said nanocomposite and, on the other hand, the particles will still be sufficiently bonded to each other (crosslinked) so that a solid, mechanically stable gel body is provided.

Component (B) accounts for 10 to 60% by wt., based on the components (A), (B) and (C) of the nanocomposite of the present invention. Preferably, component (B) is employed in an amount of from 15 to 45% and particularly 20 to 35% by wt., 20 to 30% by wt. of component (B) being particularly preferred.

Component (B) consists of one or more, particularly one, compound (preferably of organic or inorganic/organic nature) having at least two, preferably at least three (and in most cases less than 50) functional groups capable of reacting and/or interacting with surface groups present on the surface of said nanoscaled particles (A). The surface groups of said nanoscaled particles (A) are either those which are present due to the inorganic material constituting said particles (e.g., hydroxy groups), or those which have been provided on the particle surface by a surface modification of said inorganic particles in a subsequent step.

The reaction of said functional groups of the compounds of component (B) with said surface groups of the nanoscaled particles (A) may be a conventional reaction giving rise to covalent or ionic bonds and complex bonding, respectively. Merely for exemplary purposes, the condensation reaction of hydroxy groups with liberation of water or the reaction between hydroxy group and carboxy group may be mentioned here. In the present context, the term "interaction" is to denote any interaction between functional groups of compounds (B) with the surface groups of the nanoscaled particles (A), which interaction results in the functional groups of said compounds (B) and the surface groups of said nanoscaled particles (A) being in permanent immediate proximity to each other without one of the above-mentioned (covalent, ionic or coordination) bonds being observable. In this context, hydrogen bonding and van der Waals or donor-acceptor interactions may be mentioned as examples.

The functional groups of the compounds (B) are preferably those selected from the groups consisting of —OH (including —Si—OH), —SH, —$NH_2$, —NHR, —$NR_2$ (including —$CONH_2$, —CONHR, —$CONR_2$), —$NR_3^+X^-$, —COOH, —COOR, —COR, —SiOR and —CSR. A compound (B) may, of course, have two (or more) identical functional groups or functional groups which are different from each other. Also, one or more of said functional group(s) may, for example, be an (activated) C—C double bond (e.g. of a (meth)acrylic compound).

In the formula just given, R represents an optionally substituted hydrocarbyl group, e.g., an alkyl, aryl, alkenyl, alkaryl and aralkyl group, preferably having up to 20, particularly up to 10 carbon atoms, such as, e.g., methyl, ethyl, propyl, butyl, vinyl, allyl, phenyl, benzyl, tolyl and naphthyl. If two ore more radicals R are present in a group said radicals may be the same or different. Preferably, R is a $C_{1-4}$ alkyl group. $X^{31}$ represents an inorganic or organic anion such as, e.g., halide (particularly chloride, bromide and iodide), sulphate, nitrate, phosphate, hydroxide, formate, acetate, propionate and oxalate.

Preferred classes of compounds for component (B) are polyols, alkanolamines, polyamines, polytetraalkylammonium salts and mixtures thereof. Polyols having 3 or more hydroxyl groups are particularly preferred.

Specific examples of compounds (B) which may be employed according to the present invention are glycerol, ethyleneglycol, polyethyleneglycol, trimethylolpropane, pentaerythritol, sorbitol, polyvinylalcohol, monoethanolamine, diethanolamine, triethanolamine, ethylenediamine, diethylenetriamine, polytetraalkylammonium halides (particularly polytetramethylammonium chloride and bromide), (meth)acrylic acid, (meth)acrylic amide and mixtures of said compounds. Among said compounds glycerol, sorbitol and pentaerythritol are preferred. Glycerol is particularly preferred.

Naturally, compound (B) should be a compound that is either liquid at room temperature or is at least sufficiently soluble in component (C).

Component (C), employed according to the present invention, will be employed in an amount of 1–40%, preferably 10–35% and particularly 15–30% by wt. A particularly preferred range for component (C) is 20–25% by wt.

Component (C) may consist of water, of one or more organic solvents or of water and one or more water-miscible organic solvents. Preferably it consists of at least 50% by wt., and particularly 90% by wt. water, the sole use of water as component (C) being particularly preferred. If an organic solvent is employed as component (C) or as constituent thereof, said solvent has at the most one of the functional groups defined for component (B).

As exemplary solvents suitable for said component (C) there may be mentioned monoalcohols (e.g., having 1 to 4 carbon atoms such as methanol, ethanol and propanol), monocarboxylic acids (preferably having 1 to 4 carbon atoms such as formic acid, acidic acid and propionic acid), carboxylic anhydrides (such as acetic anhydride), esters (preferably having a total of 2 to 6 carbon atoms such as ethyl acetate), ethers (preferably having 2 to 6 carbon atoms such as dimethylether and diethylether), monoamines (primary, secondary and tertiary, preferably having up to 6 carbon atoms, such as diethylamine and triethylamine), monomercaptanes (such as ethanethiol and propanethiol). It is, of course, possible to also use mixtures of compounds which belong to the same class of compounds (e.g., two alcohols) or to different types of compounds. Particularly preferred organic solvents for use as and in component (C), respectively, are alkanols such as methanol and ethanol.

Component (D) optionally used for the production of the nanocomposite according to the present invention is used in an amount of at the most 10%, preferably at the most 5% and, particularly, at the most 3% by wt., based on the entire nanocomposite. Preferably component (D) will not be employed. If component (D) is made use of, the additives consist of additives that are conventional for such purposes such as, e.g., conventional stabilizers for said component (A), urea, metal colloids, dyes (e.g., phthalocyanine dyes, photochromic or thermochromic dyes, etc.).

The nanocomposite according to the present invention can simply be prepared by combining and mixing components (A), (B) and (C) (as well as optionally (D)) in any order (and preferably at ambient temperature).

If the nanocomposite is, e.g., to be used as filling for insulation glass panes it is preferably filled into the space intended therefor as soon as possible after said components (A) to (D) have been combined, and is then allowed to cure (solidify to form a gel) within said space. The curing process may take place at room temperature but is strongly accelerated at elevated temperature (e.g., up to 80° C.).

Experimentally it was found that the nanocomposite according to the present invention is capable of providing a mechanically stable, transparent and hard gel body which, even after more than 60 days of accelerated ageing test at 80° C. (estimation for a term of 10 years of guarantee), does not show any of the known syneresis phenomena such as blisters, haze, shrinking or phase separation, and which, upon heating, results in a dense microstructure having fine pores that ensures excellent heat protection. For example, a fireproofing corresponding to classification F-30 can be achieved with a gel filling having a thickness of only 8 mm in a conventional insulation glass assembly having thermally pre-stressed panes of a thickness of 5 mm. With gels of the prior art this can only be achieved with multiple pane assemblies and gel fillings, respectively having a thickness of 12 to 15 mm.

Furthermore, at least a part of the nanocomposites according to the present invention shows thermotropic properties (due to the reversible agglomeration of the nanoscaled particles (A) to form larger, light-scattering particles upon heating, which agglomeration results in the nanocomposites taking on a white color). This affords an additional contribution to fireproofing since the penetration of radiation heat through the nanocomposite is prevented and hindered, respectively.

The nanocomposite according the present invention can be employed in many fields, e.g., as filling for spaces between building components made of glass (particularly transparent insulation glass assemblies) or plastics, metal, wood, gypsum plaster, fermacel, presspahn, ceramics, natural or artificial stone, as well as in electrical cables for fire protection purposes. It may also be used as a coating composition for building components and is suitable for the production of thermally and mechanically stable foams in the form of, e.g., bulk materials or molded parts.

The present nanocomposite may also be used as a blend with pigments or (organic or inorganic, e.g., fibrous, pulverulent or plate-like) coarser, non-nanoscaled aggregates such as mica pigments, iron oxides, wood flour, glass fibers, metal fibers, carbon fibers, sands, clays and bentonite if the transparency of the materials obtainable thereby is not an issue.

The following examples serve to illustrate the present invention.

EXAMPLE 1

Nanoscaled $SiO_2$ (10 kg; Aerosil OX 50 from Degussa), 8.5 kg of glycerol and 7.9 kg of water are homogenized by means of a dissolver disc to form a milky white sol. To the resultant mixture there are added, with vigorous stirring, 4.15 kg of KOH (residual water content 15% by wt.). Subsequently the mixture is evacuated until it boils and after 10 minutes said mixture is filled into an insulation glass assembly with a distance between the panes of 9 mm. After a few hours the mixture solidifies to form a translucent gel which, after thermal treatment at 80° C. for 4 to 8 hours, becomes clear as water and transparent. The final composition is as follows: 28.8% by wt. of water, 28.8% by wt. of glycerol and 42.4% by wt. of potassium silicate.

A fire test with wooden boards was carried out on said mixture. The foam could not be melted within a short period of time even when exposed to the flame of a 1300° C. hot burner, but provided insulation against said high temperature.

When the composition is filled into an insulation glass assembly having pre-stressed panes (thickness 5 mm) and a space between the panes of 8 mm, the classification F-30 is achieved in a fire test according to DIN 4102. For the same results to be achieved by commercially available gels, said gels require a gel-filled space between the panes of 12–15 mm and correspondingly are of higher weight and less manageable.

EXAMPLE 2

Nanoscaled $SiO_2$ (10 kg; Aerosil OX 50) is stirred into a mixture of 8.0 kg of glycerol, 0.5 kg of pentaerythritol and 5 kg of water and is homogenized by means of a dissolver disc to form a milky white sol. A dispersion of polyol-modified $SiO_2$ nanoparticles is obtained. In parallel, 4.15 kg of potassium hydroxide pellets (residual water content 15% by wt.) are dissolved in 2.9 kg of water. In order to form the gellike nanocomposite the $SiO_2$ dispersion is intimately mixed, with cooling, with said KOH solution, degasified and filled into an insulation glass assembly. Within several hours the mass solidifies by itself to form a translucent gel. The gelling process may be accelerated by heat, and after about 4–8 hours results in clear gels which due to the higher number of OH groups in compound B (4 versus 3) as compared to Example 1 and the stronger particle crosslinking resulting therefrom are harder than those obtained in Example 1.

EXAMPLE 3

Example 2 is repeated with the exception that 0.5 kg of sorbitol are used instead of 0.5 kg of pentaerythritol. Essentially the same results as in Examples 1 and 2 are obtained (with the exception of an even higher hardness of the gels than in Example 2).

We claim:

1. A process for preparing a nanocomposite, comprising combining:
   (A) at least 35% by weight of nanoscale particles of at least one inorganic compound, the particles having an average particle size of up to 200 nm and having surface groups present on the surface of the particles;
   (B) 10–60% by weight of at least one compound containing at least two functional groups capable of reacting and/or interacting with the surface groups present on the surface of the nanoscale particles of the component (A); and
   (C) 10–40% by weight of water and/or at least one organic solvent which has not more than one of the functional groups contained by the component (B);
   the above percentages being percentages of the sum of the components (A), (B), and (C), and
   (D) 0–10% by weight of additives, the percentage being a percentage of the weight of the nanocomposite,
   where the prepared nanocomposite contains at least 10% by weight of component (C), based on the sum of the components (A), (B), and (C).

2. A process of claim 1 where the content of component (A) is at least 40% by weight.

3. A process of claim 1 where the content of component (B) is 15–45% by weight.

4. A process of claim 3 where the content of component (B) is 20–35% by weight.

5. A process of claim 1 where the content of component (C) is 10–35% by weight.

6. A process of claim 5 where the content of component (C) is 15–30% by weight.

7. A process of claim 1 where the content of component (D) is 0–5% by weight.

8. A process of claim 7 where the content of component (D) is 0–3% by weight.

9. A process of claim 1 where the or each inorganic compound of component (A) is selected from the group consisting of the oxides and mixed oxides of Al, Si, P, B, Sn, Zn, Ti, Zr, W, the alkali metals, and the alkaline earth metals.

10. A process of claim 9 where the or each inorganic compound of component (A) is selected from the group consisting of the oxides and mixed oxides of Si, Al, Ti, and Zr.

11. A process of claim 1 where the or each functional group-containing compound of component (B) contains at least two identical or different functional groups selected from the group consisting of —OH, —SH, —NH$_2$, —NHR, —NR$_2$, —NR$_3{}^+$X$^-$, —COOH, —COOR, —COR, —SiOR, —CSR, and optionally activated C—C double bonds, where R represents identical or different optionally substituted hydrocarbyl groups and X$^-$ represents an inorganic or organic anion.

12. A process of claim 11 where at least one functional group-containing compound of component (B) contains at least three functional groups.

13. A process of claim 11 where the or each functional group-containing compound of component (B) is selected from the group consisting of polyols, alkanolamines, polyamines, and polytetraalkylammonium salts.

14. A process of claim 1 where the or each functional group-containing compound of component (B) is selected from the group consisting of glycerol, ethylene glycol, poly(ethylene glycol), trimethylolpropane, pentaerythritol, sorbitol, poly(vinyl alcohol), monoethanolamine, diethanolamine, triethanolamine, ethylenediamine, diethylenetriamine, polytetraalkylammonium halides, acrylic acid, methacrylic acid, acrylamide, and methacrylamide.

15. A process of claim 1 where component (C) comprises at least 50% by weight of water.

16. A process of claim 15 where component (C) comprises at least 90% by weight of water.

17. A process of claim 1 where component (C) comprises at least one organic solvent selected from the group consisting of monoalcohols, monocarboxylic acids, monocarboxylic anhydrides, monoesters, monoethers, monoamines, and monomercaptans.

18. A nanocomposite prepared by the process of claim 1.

19. A nanocomposite of claim 18 in the form of a solidified gel.

20. A nanocomposite of claim 19 in the form of a solidified transparent gel.

21. A process of claim 1 where the nanoscaled particles have an average particle size of up to 100 nm.

22. A process of claim 21 where the nanoscaled particles have an average particle size of up to 50 nm.

23. A process of claim 22 where the nanoscaled particles have an average particle size of between 1 nm and 20 nm.

24. A transparent glass insulation assembly comprising, sandwiched between two glass planes, a nanocomposite prepared by combining:
(A) at least 35% by weight of nanoscale particles of at least one inorganic compound, the particles having an average particle size of up to 200 nm and having surface groups present on the surface of the particles;
(B) 10–60% by weight of at least one compound containing at least two functional groups capable of reacting and/or interacting with the surface groups present on the surface of the nanoscale particles of the component (A); and
(C) 10–40% by weight of water and/or at least one organic solvent which has not more than one of the functional groups contained by the component (B);
the above percentages being percentages of the sum of the components (A), (B), and (C), and
(D) 0–10% by weight of additives, the percentage being a percentage of the weight of the nanocomposite,
where the prepared nanocomposite contains at least 10% by weight of component (C), based on the sum of the components (A), (B), and (C).

25. A method of fireproofing at least one building component, comprising coating the or each component, or filling the spaces between at least two components, with a nanocomposite prepared by combining:
(A) at least 35% by weight of nanoscale particles of at least one inorganic compound, the particles having an average particle size of up to 200 nm and having surface groups present on the surface of the particles;
(B) 10–60% by weight of at least one compound containing at least two functional groups capable of reacting and/or interacting with the surface groups present on the surface of the nanoscale particles of the component (A); and
(C) 10–40% by weight of water and/or at least one organic solvent which has not more than one of the functional groups contained by the component (B);
the above percentages being percentages of the sum of the components (A), (B), and (C), and
(D) 0–10% by weight of additives, the percentage being a percentage of the weight of the nanocomposite,
where the prepared nanocomposite contains at least 10% by weight of component (C), based on the sum of the components (A), (B), and (C).

* * * * *